United States Patent
Helmstetter

(10) Patent No.: US 6,637,770 B2
(45) Date of Patent: Oct. 28, 2003

(54) GAS BAG MODULE WITH MULTI-FUNCTION CONDUCTOR FILM

(75) Inventor: Matthias Helmstetter, Aschaffenburg (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/954,672

(22) Filed: Sep. 17, 2001

(65) Prior Publication Data

US 2002/0074780 A1 Jun. 20, 2002

(30) Foreign Application Priority Data

Sep. 21, 2000 (DE) .......................................... 200 16 386

(51) Int. Cl.⁷ .......................... B60R 21/01; B60R 21/16
(52) U.S. Cl. ..................................... 280/731; 200/61.54
(58) Field of Search ............................. 280/731, 728.2; 200/61.55, 61.54

(56) References Cited

U.S. PATENT DOCUMENTS

| | | |
|---|---|---|
| 5,002,306 A | 3/1991 | Hiramitsu et al. |
| 5,303,952 A | 4/1994 | Shermetaro et al. |
| 5,331,124 A | 7/1994 | Danielson |
| 5,505,483 A * | 4/1996 | Taguchi et al. ............. 280/731 |
| 6,062,595 A | 5/2000 | Ha |
| 6,147,315 A * | 11/2000 | Rudolph et al. ......... 200/61.55 |
| 6,183,005 B1 * | 2/2001 | Nishijima et al. .......... 280/731 |

FOREIGN PATENT DOCUMENTS

| | | |
|---|---|---|
| DE | 43 13 030 | * 10/1993 |
| DE | 4318517 A1 | 1/1994 |
| DE | 19529533 A1 | 2/1997 |
| DE | 19809226 A1 | 9/1998 |
| DE | 29822832 U1 | 4/1999 |
| WO | WO9802337 | 1/1988 |
| WO | WO0050264 | 8/2000 |

* cited by examiner

*Primary Examiner*—Peter C. English
(74) *Attorney, Agent, or Firm*—Tarolli, Sundheim, Covell & Tummino, L.L.P.

(57) ABSTRACT

A gas bag module for installation in a vehicle steering wheel comprises a carrier, a gas generator mounted to the carrier, and a multi-function conductor film. The multi-function conductor film is disposed on a rear side of the gas generator and on a rear side of the carrier.

5 Claims, 4 Drawing Sheets

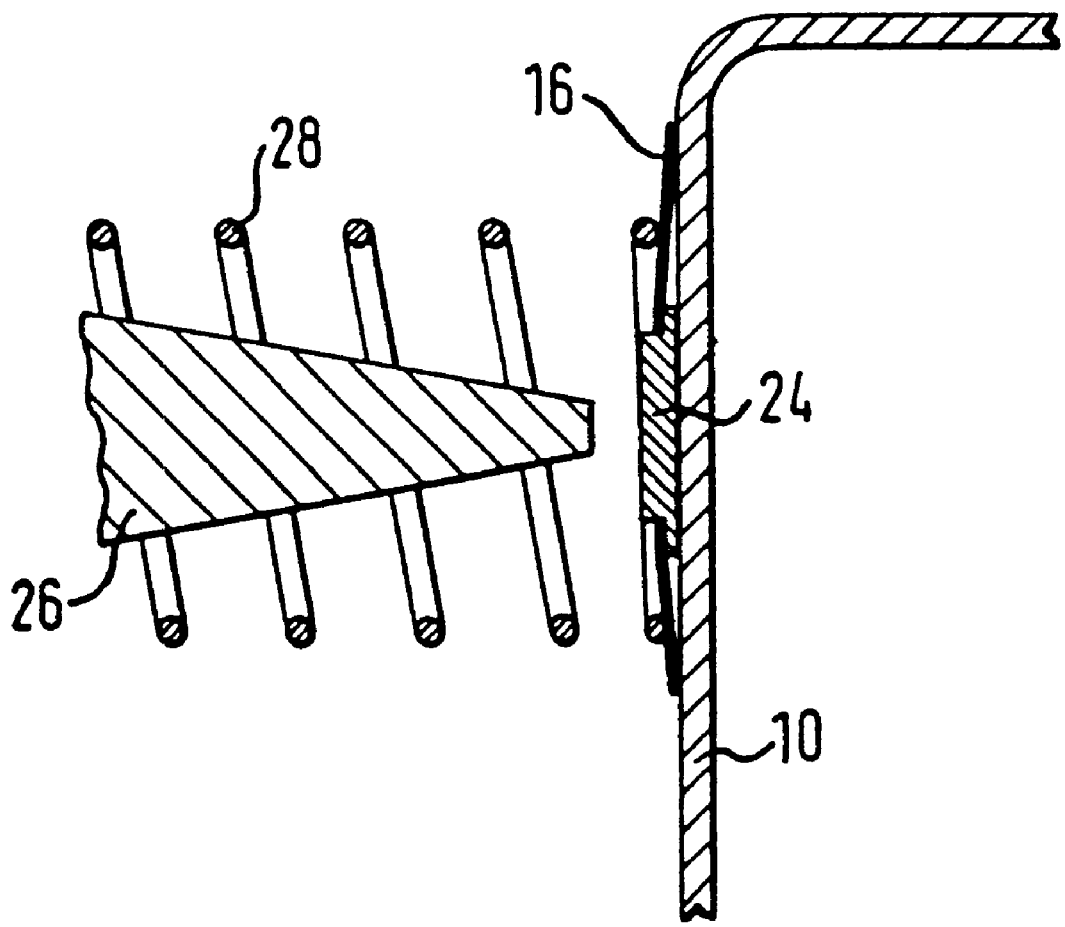

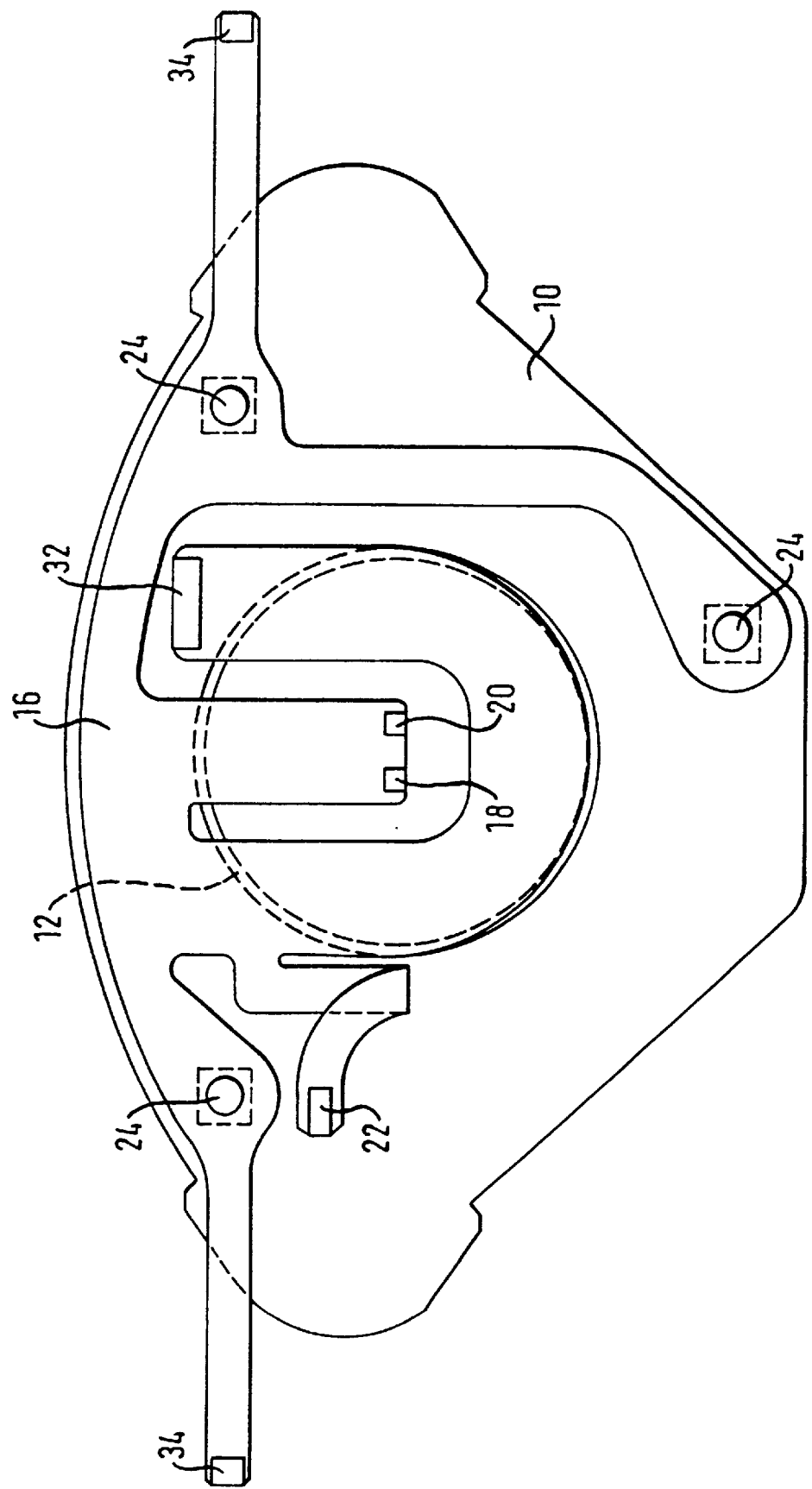

GAS BAG MODULE WITH MULTI-FUNCTION CONDUCTOR FILM

TECHNICAL FIELD

This invention relates to a gas bag module for installation in a vehicle steering wheel.

BACKGROUND OF THE INVENTION

A gas bag module comprising a carrier, a gas generator mounted to the carrier, and a multi-function conductor film is already known from U.S. Pat. No. 6,062,595. The multi-function conductor film is embedded in a cover which in the rest condition covers a gas bag to be inflated by means of the gas generator. The multi-function conductor film is provided with a plurality of switches, by means of which for instance the air-conditioning system or the radio system of the vehicle in which the gas bag module is mounted can be controlled. What is disadvantageous in the known gas bag module is the fact that the multi-function conductor film is mounted in an area of the gas bag module through which the gas bag is deployed upon activation of the gas generator. Therefore, both during the construction and during the assembly care must be taken that the conductor film together with the switches mounted thereon neither impairs deployment nor endangers a vehicle occupant during deployment.

BRIEF SUMMARY OF THE INVENTION

Thus, it is the object of the invention to further develop a gas bag module as mentioned above such that a simpler construction is obtained at lower cost.

This is achieved in a gas bag module which comprises a carrier, a gas generator mounted to the carrier, and a multi-function conductor film. The multi-function conductor film is disposed on a rear side of the gas generator and on a rear side of the carrier. In this way, a conventional, inexpensive cover can be used for the gas bag, while at the same time a multi-function conductor film can be used. The latter allows to integrate a multitude of functions in a single component, which can then be connected with a single plug. Thus, the conductor film allows to both connect and ground the gas generator as well as integrate a multitude of further functions, for instance a horn contact for actuating the horn. For transmitting the signals for the various functions, either plugs may be provided at the conductor film, which plugs are plugged into counterplugs at the steering wheel during the assembly of the gas generator, or actually switch areas which are closed or opened by pressing onto an actuation surface on the steering wheel. In this way, a multitude of functions can be switched with a minimum effort.

BRIEF DESCRIPTION OF THE DRAWINGS

FIG. 3 schematically shows a section along plane III—III of FIG. 1; and

FIG. 4 shows a schematic bottom view of a gas bag module with a conductor film in accordance with a second embodiment.

DETAILED DESCRIPTION OF THE PREFERRED EMBODIMENTS

Figure 1:
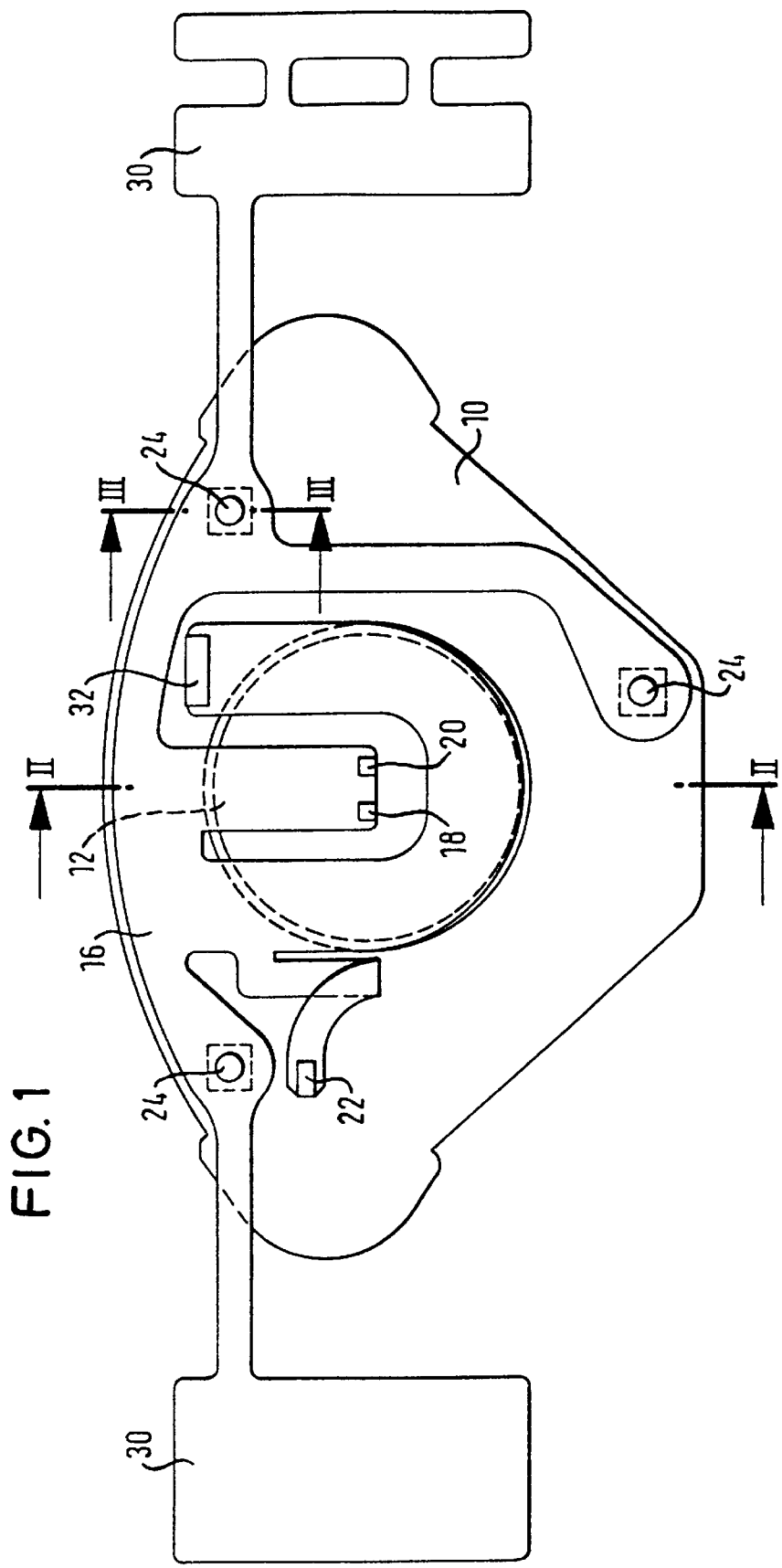
FIG. 1 shows a schematic bottom view of a gas bag module with a multi-function conductor film in accordance with a first embodiment.
Figure 2:
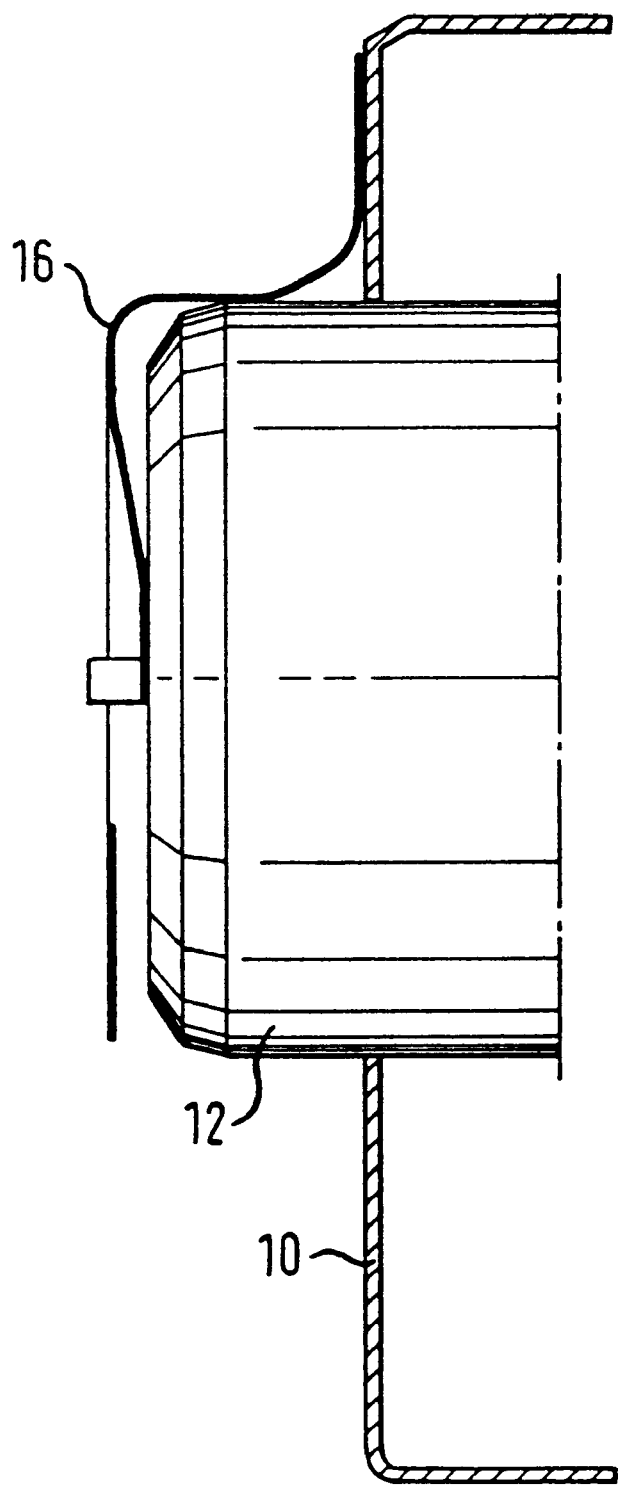
FIG. 2 schematically shows a section along plane II—II of FIG. 1.

FIG. 1 schematically shows a gas bag module which has a carrier 10 as well as a gas generator 12. The gas generator 12 is a two-stage gas generator, i.e. has two gas-generating charges to be ignited independent of each other. On the rear side of the gas generator as well as on the rear side of the carrier, i.e. on the side facing away from the vehicle occupant in the future mounting position in a vehicle, a multi-function conductor film 16 (see also FIGS. 2 and 3) is disposed. In a conventional way as such, the conductor film 16 has a multitude of electrical conductor tracks which are insulated from each other.

The conductor film 16 is provided with two gas generator plugs 18, 20, which serve for connecting the first and the second charge of the gas generator 12. The conductor film 16 is furthermore provided with a grounding plug 22, which is provided for grounding the gas generator. Furthermore, the conductor film 16 has three horn contacts 24 (see FIG. 3). In the region of the horn contacts 24, the conductor film is bonded with the carrier 12, for instance by a double-sided adhesive tape. With each of the horn contacts an actuating nose 26 is cooperating, which is mounted to the steering wheel such that the horn contact is closed when the gas bag module is urged away from the vehicle occupant against the effect of a return spring 28. An attachment of the carrier and the gas generator suited for this purpose is generally known, so that the details thereof need not be discussed here.

The conductor film 16 is also provided with two multi-function switch areas 30 equipped with multi-function switches, which are provided for being mounted in the steering wheel. The multi-function switches preferably are SMD (surface mounted device) components which can directly be applied onto the conductor film. By means of these multi-function switches a radio system or an air-conditioning system can, for instance, be controlled without the driver having to take his hands away from the steering wheel.

Finally, the conductor film 16 is provided with one single combination plug 32 which serves to be plugged into a complementary plug at the steering wheel or possibly also at the vehicle. By means of this single combination plug, all conductor tracks of the conductor film are connected, so that the integrated functions can be selected, i.e. activating the gas generator, switching the horn, controlling the radio system, the air-conditioning system etc.

The advantage of the gas bag module according to the invention consists in that during the assembly only one single plug must be plugged in at the steering wheel side or at the vehicle side, namely the combination plug 32, to ensure that all conductor tracks are connected. In the previous constructions, for instance the gas generator or other switches had to be connected separately.

FIG. 4 shows a gas bag module with a conductor film in accordance with a second embodiment. In contrast to the preceding embodiment, the conductor film is now provided with two multi-purpose plugs 34 instead of the multi-function switch areas, which multi-purpose plugs are plugged into counterparts at the steering wheel, these counterparts being associated to multi-function switches disposed there. This embodiment, too, involves a particularly low mounting effort.

What is claimed is:

1. A gas bag module for installation in a vehicle steering wheel, said gas bag module comprising a carrier, a gas generator mounted to said carrier, and an electrical multi-function conductor film, said multi-function conductor film being on a rear side of said gas generator and being bonded with a rear side of said carrier, said multi-function conductor film including a plurality of electrically insulated conductor tracks for actuating multi-functions including actuating said gas generator.

2. The gas bag module as claimed in claim 1, wherein said conductor film is provided with at least one contact for actuating a horn, a counterpart to said contact being provided which is mounted to said vehicle steering wheel and which closes said contact.

3. The gas bag module as claimed in claim 1, wherein said conductor film is provided with at least one plug for connecting said gas generator to said conductor film.

4. The gas bag module as claimed in claim 3, wherein said gas generator is a two-stage gas generator and two plugs are provided on said conductor film.

5. The gas bag module as claimed in claim 1, wherein said conductor film is provided with a plug for grounding said gas generator.

* * * * *